Dec. 11, 1956

R. B. DUNNAVAN 2,773,692

BRUSH CARRYING DEVICE

Filed May 13, 1950

INVENTOR.
RALPH B. DUNNAVAN
BY
Chas. C. Reif.

United States Patent Office 2,773,692

Patented Dec. 11, 1956

2,773,692

BRUSH CARRYING DEVICE

Ralph B. Dunnavan, Minneapolis, Minn.

Application May 13, 1950, Serial No. 161,855

1 Claim. (Cl. 274—47)

This invention relates to a record player, and particularly to an attachment for the tone arm thereof. It is desirable to have a brush connected to the tone arm which engages the record and sweeps or clears away any dirt or dust particles that might be in the record grooves in advance of the needle. Many modern record players are now constructed to play records which are rotated at different speeds. For this purpose a member is carried in the tone arm in which two needles are mounted, said member being movable to two different positions respectively to place said needles in operative position. This usually results in the tone arm being at different distances from the record when said needles are respectively in operation. A brush mounted to be in proper position to the record with one needle in operation would not be in proper position when the other needle is in operation. The brush might push on the record to such an extent as to raise the needle out of the groove.

It is an object of this invention to provide an attachment for a tone arm including a member carrying a brush adapted to engage the record, said member being mounted so that the brush can adjust itself to be in proper position relatively to the record when either of said needles is in operation.

It is another object of the invention to provide in combination with a tone arm having a member mounted therein carrying two needles and movable to different positions to bring said needles into respective operative position with a record, a bracket constructed and arranged to fit on the free end portion of said tone arm, said bracket having a portion at the front end of said tone arm, and a member pivotally connected to said portion, said member carrying a brush adapted to engage the record whereby said brush can adjust itself to be in proper engagement with the record with either of said needles in operation.

It is more specifically an object of this invention to provide in combination with the tone arm of a record player, which arm carries a member with two needles mounted therein, said member being movable to different positions to respectively bring said needles into operative position, said bracket having a portion at the free end of said tone arm, a second member pivotally connected to said portion about a substantially horizontal axis, a brush extending substantially at right angles to said second member and carried thereby adapted to engage the record whereby said brush can adjust itself to be in proper operative relation to the record regardless of which needle is in operation.

These and other objects and advantages of the invention will be fully set forth in the following description made in connection with the accompanying drawings in which like reference characters refer to similar parts throughout the several views and in which.

Figures 1, 2, 3, 4:
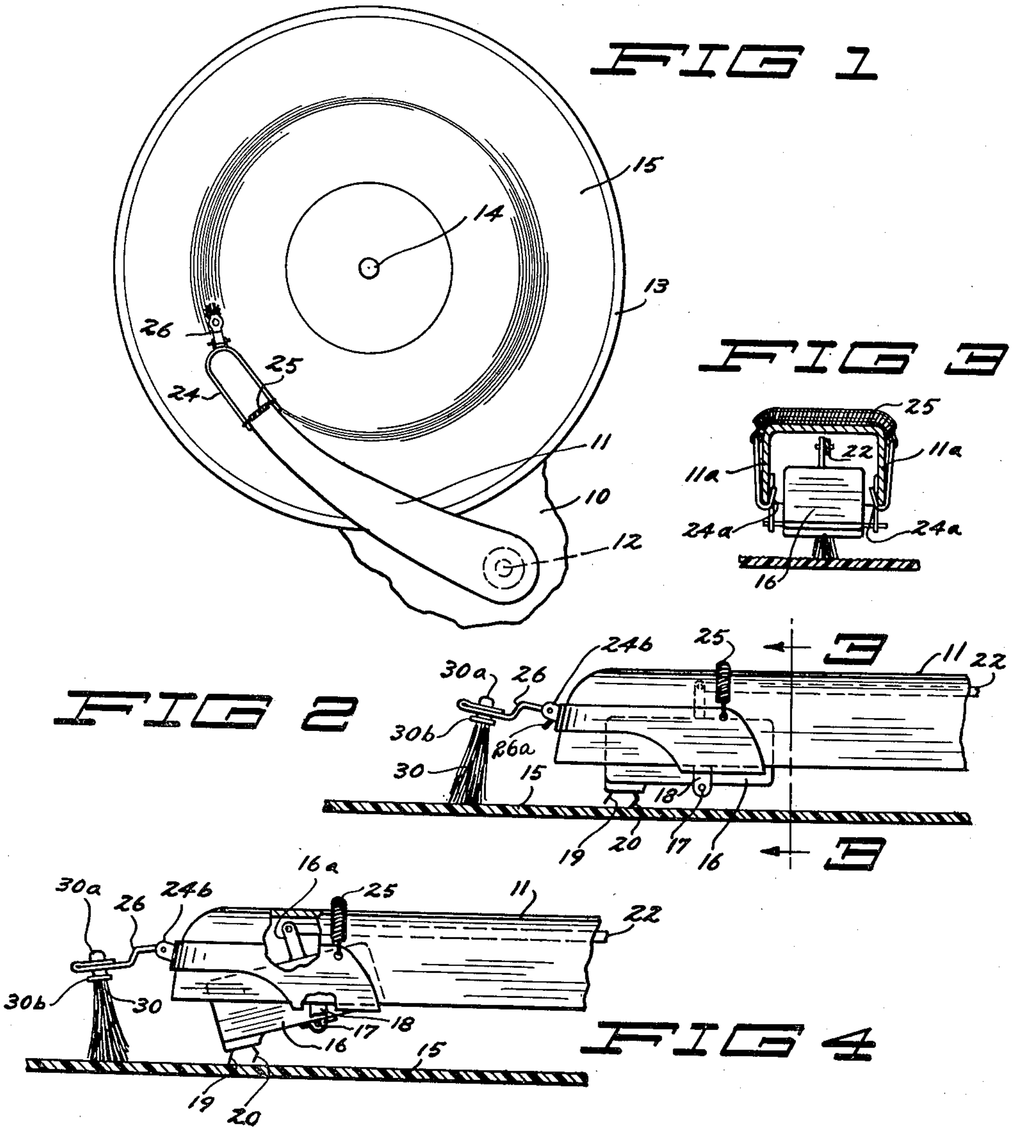
Fig. 1 is a plan view showing parts of a record player including the tone arm and the device of this invention carried on said arm.
Fig. 2 is a view in side elevation of the free end portion of the tone arm showing the invention.
Fig. 3 is a vertical section taken on line 3—3 of Fig. 2, as indicated by the arrows.
Fig. 4 is a view similar to Fig. 2 showing parts in different positions, a portion being broken away and another portion being shown in vertical section.

Referring to the drawings, a portion of a record player of well known type is shown which comprises the supporting plate 10, a tone arm 11 which is mounted for oscillating movement about a shaft 12 disposed in plate 10. A turntable 13 rotatable about the axis of a shaft 14 is also shown, on which is supported, as usual, a record 15. The tone arm 11 has mounted therein a member 16 swingable about the axis of a pin 17 carried in small brackets 18 secured to the tone arm. Member 16 carries a pair of needles 19 and 20. When needle 20 is in operative position to engage the record 15, member 16 occupies the position shown in Fig. 2 in which its top and bottom surfaces are substantially parallel to the bottom of the tone arm 11. When needle 19 is in operative position to engage the record 15, member 16 occupies the position shown in Fig. 4, at which time its bottom surface is at a decided angle to the lower side of the tone arm. Member 16 is moved to its respective positions by any suitable means, such as a rod 22 pivotally connected to an arm **16*a* secured to member 16. It will be noted that when member 16 is in the position shown in Fig. 2, that the tone arm is a certain distance from the top of the record, but that when member 16** is in the position shown in Fig. 4, the tone arm is at a greater distance from the record.

Figure 5:
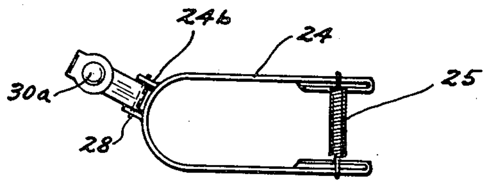
Fig. 5 is a top plan view of the device of this invention.

In accordance with the present invention, a bracket 24 is provided, and while this might take various forms, in the embodiment of the invention illustrated it is shown as made from a comparatively thin plate of material and as of substantially U shape in plan. Member 24 is adapted to fit around the front or free end of the tone arm, as shown in Figs. 1 to 4. Member 24 has a narrow front portion and a wider rear portion, the bottom edges **24*a* of which latter portion are reversely bent upwardly, as shown in Fig. 3, and embrace the bottom edge portions of the side flanges 11*a* of the tone arm. Said tone arm 11 is shown as of channel shape in vertical cross section, as shown in Fig. 3. A tensile coiled spring 25 is secured to the sides of member 24 adjacent the top and rear thereof, which spring extends across the top of the tone arm, as shown in Figs. 1 to 4. Member 24, as stated, has a portion disposed at the front or free end of the tone arm, and small spaced lugs 24*b* project from member 24, as shown in Figs. 1 and 5. Lugs 24*b* project at a slight angle to the longitudinal center line of member 24. A member or arm 26 is pivotally connected to the lugs 24*b* by a pivot pin 28. The end of arm 26 is bent to embrace pin 28. Arm 26 also has a terminal portion 26*a* which engages the front end of bracket 24 and limits the downward movement of arm 26. The arm 26 carries adjacent its outer end a brush 30 which is disposed substantially at right angles to arm 26. While brush 30 could be held in various ways, in the embodiment of the invention illustrated, arm 26 is shown as bent reversely at its outer end to have superposed engaging portions, and brush 30 has a shank portion 30*a* extending through an aperture in the superposed portions of arm 26. Shank 30*a* fits frictionally in arm 26 so that brush 30 can be held in different positions relatively to arm 26. A collar 30*b* is disposed at the bottom of shank 30*a* which limits the upward movement of brush 30. Brush 30** is made of very fine bristles and these engage the grooves in the record which are somewhat in advance of the playing needle.

In operation, the member 24 is placed on the tone arm, as shown, and will be clamped thereon and held firmly in position by the spring 25. The brush 30 and arm 26 can swing freely about the axis of pin 28 so that the brush will properly engage the record in either position of member 16 and regardless of which needle 19 or 20 is in use. If the tone arm 11 is lifted, portion 26a will limit the downward swinging movement of arm 26, and brush 30 so that it will not get under the tone arm and have to again be lifted to position. If the arm 26 were made rigid with bracket 24 and the brush would be in proper engagement with needle 19 in operation, the brush would press too hard on the record when member 16 is swung to its other position with needle 20 in playing position. The brush would press on the record with too much force and tend to lift the needle from the record grooves. With the present construction the brush 30 can adjust itself and will bear on the record with the desired degree of pressure, regardless of which needle is in playing position.

From the above description it will be seen that I have provided a simple and highly efficient device for carrying a record brush. The same can be very easily and quickly placed on the tone arm and the brush will automatically adjust itself to be in proper position and exerting proper pressure with either playing needle in operative position. The device is quite simple and can be inexpensively produced. The same has been amply demonstrated in actual practice and found to be very successful and efficient.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

In connection with a record player having an elongated substantially channel-shaped playing arm adapted to carry a plurality of needles and playable in a plurality of operating positions having in combination, a U-shaped bracket extending substantially longitudinally about and horizontally embracing the outer end portion of said arm, said bracket having its rear bottom edges reversely bent upwardly to embrace the bottom edge portions of the side flanges of said playing arm and a spring extending across the top of said arm connecting the sides of said bracket and urging said bracket into engagement with said arm, a member pivotally secured at its inner end about a horizontal axis to the front end portion of said member and extending forwardly and inclined inwardly thereof, and a brush depending from the outer end portion of said member whereby said member and said brush are movable freely upwardly and downwardly in relation to the playing arm and are adaptable for use with said arm in any of said plurality of operating positions of said arm.

References Cited in the file of this patent

UNITED STATES PATENTS

| | | |
|---|---|---|
| 832,249 | Forsell | Oct. 2, 1906 |
| 1,202,428 | Rennell | Oct. 24, 1916 |
| 1,249,720 | Christian | Dec. 11, 1917 |
| 1,435,645 | Kidder et al. | Nov. 14, 1922 |
| 1,442,680 | Borst et al. | Jan. 16, 1923 |
| 1,472,857 | Swensen | Nov. 6, 1923 |
| 2,259,275 | Stone | Oct. 14, 1941 |
| 2,294,660 | Hess | Sept. 1, 1942 |
| 2,320,572 | Dann | June 1, 1943 |

FOREIGN PATENTS

| | | |
|---|---|---|
| 434,153 | France | Jan. 26, 1912 |